(12) United States Patent
Mittendorf et al.

(10) Patent No.: US 12,158,188 B2
(45) Date of Patent: Dec. 3, 2024

(54) DISC BRAKE HAVING AN ADJUSTING SPINDLE

(71) Applicant: ZF CV Systems Europe BV, Brussels (BE)

(72) Inventors: Roman-Marius Mittendorf, Heppenheim (DE); Martin Stumpf, Lampertheim (DE)

(73) Assignee: ZF CV Systems Europe BV, Brussels (BE)

( * ) Notice: Subject to any disclaimer, the term of this patent is extended or adjusted under 35 U.S.C. 154(b) by 334 days.

(21) Appl. No.: 17/635,752

(22) PCT Filed: Aug. 16, 2019

(86) PCT No.: PCT/EP2019/071988
§ 371 (c)(1),
(2) Date: Feb. 16, 2022

(87) PCT Pub. No.: WO2021/032262
PCT Pub. Date: Feb. 25, 2021

(65) Prior Publication Data
US 2022/0307564 A1    Sep. 29, 2022

(51) Int. Cl.
*F16D 65/66* (2006.01)

(52) U.S. Cl.
CPC ...... *F16D 65/66* (2013.01); *F16D 2250/0023* (2013.01)

(58) Field of Classification Search
CPC ........ F16D 65/56; F16D 65/66; F16D 65/567; F16D 65/568

USPC .................... 188/71.8, 71.9, 196 B
See application file for complete search history.

(56) References Cited

U.S. PATENT DOCUMENTS

| | | | | |
|---|---|---|---|---|
| 2,096,050 | A | * | 10/1937 | Lucker ...................... B66F 3/16 254/102 |
| 3,365,042 | A | * | 1/1968 | Smirl ...................... G05G 23/02 192/89.2 |
| 3,475,036 | A | * | 10/1969 | Smith ................... B62B 5/0423 188/110 |
| 3,489,253 | A | * | 1/1970 | Kershner ................ F16D 55/40 188/71.9 |
| 3,602,343 | A | * | 8/1971 | Billeter ............. B61H 15/0057 188/196 D |

(Continued)

FOREIGN PATENT DOCUMENTS

| | | |
|---|---|---|
| DE | 202010003739 U1 | 7/2010 |
| DE | 102014111229 A1 | 2/2016 |

(Continued)

OTHER PUBLICATIONS

European Patent Office, Rijswijk, Netherlands, International Search Report of International Application No. PCT/EP2019/071988, Mailed Feb. 12, 2020, 2 pages.

*Primary Examiner* — Thomas J Williams
(74) *Attorney, Agent, or Firm* — Dickinson Wright PLLC

(57) ABSTRACT

A disc brake includes a pressure piece, an adjusting spindle, and an adjustment unit. The adjusting spindle is guided through an opening, provided with a thread unit, of the pressure piece. The adjusting spindle is guided through the adjusting unit, and the adjusting unit protrudes into the opening. The adjusting spindle has a limitation disposed in a thread turn of the adjusting spindle.

10 Claims, 4 Drawing Sheets

(56) References Cited

U.S. PATENT DOCUMENTS

| | | | | |
|---|---|---|---|---|
| 4,448,392 A | * | 5/1984 | Ladewski | ............... B66F 3/08 |
| | | | | 411/360 |
| 2017/0307035 A1 | | 10/2017 | Henning et al. | |
| 2022/0307564 A1 | * | 9/2022 | Mittendorf | ............ F16D 65/66 |

FOREIGN PATENT DOCUMENTS

| | | |
|---|---|---|
| DE | 102014017430 A1 | 5/2016 |
| DE | 102015013240 A1 | 4/2017 |
| WO | 2004046579 A1 | 6/2004 |
| WO | 2010024400 A1 | 3/2010 |

* cited by examiner

DISC BRAKE HAVING AN ADJUSTING SPINDLE

FIELD

The present disclosure relates to a disc brake having an adjusting spindle, in particular to a disc brake for motor vehicles having an adjusting spindle and an adjustment unit.

BACKGROUND

Disc brakes for motor vehicles are generally known and have, for tensioning a brake disc, a tensioning unit that includes an adjusting spindle, a pressure piece, and an adjustment unit. The pressure piece has, axially with respect to the brake disc, an opening, and a thread for guiding the adjusting spindle is arranged in the opening. A threaded ring which is arranged on the adjusting spindle is used in combination with a plate spring to secure the adjusting spindle in order to prevent undesirable feeding movements or return movements. Via a brake cylinder which is connected to a rotary lever of the tensioning unit, the brake disc is tensioned, by a rotational movement of the rotary lever in the direction of the brake disc, by the pressure piece with the adjusting spindle and the adjustment unit being displaced axially in the direction of the brake disc and pressing the tensioning-side brake liner via a plate spring of the adjusting spindle against the brake disc. As a result of the contact of the pressure plate, a displacement of the brake caliper disc is initially brought about until the reaction-side brake liner is in contact with the brake disc, whereby the brake disc, as a result of the tensioning-side brake liner and the reaction-side brake liner, is tensioned. The tensioning side is intended to be understood to be the side of the brake disc on which the tensioning unit is arranged. In contrast, the reaction side is intended to be understood to be the side of the disc brake which is located opposite the tensioning side of the disc brake. The braking operation produces abrasion of the brake liners which results in an air gap, that is to say, the spacing between the brake disc and the brake liners, becoming greater as the abrasion of the brake liners increases. With an increasingly large air gap, the lever path for tensioning the disc brake increases, whereby a delay of the braking action increases and wherein a vehicle, as a result of the displaced pressure point of the brake, is braked with a delay. For the reasons mentioned, the wear of the brake liners is compensated for by a correction of the air gap to maintain the complete functionality and efficiency of the disc brake. The correction of the air gap is carried out by an axial feed movement of the adjusting spindle in the direction of the brake disc as required.

During the feed movement of the adjusting spindle, the situation may occur that the adjusting spindle is rotated too far axially in the direction of the brake disc. In the situation described above, there is the risk of an excessively small contact coverage of the adjusting spindle with additional components of the tensioning unit, including a wrap spring of the adjustment unit or a guiding sleeve of the adjustment unit, unscrewed from the pressure piece. The term "contact coverage" is intended to be understood to refer to the region of the feed unit which is in contact with the adjusting spindle. Furthermore, a missing contact coverage may also occur in the event of incorrect handling of a restoring unit of the disc brake. For a liner change, the adjusting spindle is axially unscrewed manually via the restoring unit, counter to the brake disc. Both the above-mentioned situations may, sometimes in an unnoticed manner, result in a sudden loss of the adjustment function of the adjustment unit of the disc brake.

DE 10 2014 111 229 B4 discloses a disc brake which is intended to prevent the brake caliper from falling out of the tensioning-side brake liner carrier. An independent stop element which is constructed as a sleeve is arranged on the brake caliper or a component which is associated with the brake caliper.

SUMMARY

An object of the invention is to provide a limitation of the rotational movement of the adjusting spindle of a disc brake without the use of additional components and without increasing the cylindrical outer contour of the adjusting spindle, and wherein the limitation at the same time acts as a loss prevention device.

The object is achieved by providing a limitation in a thread turn of an adjusting spindle. A thread turn is intended to be understood to be a profiled notch which extends continuously in a thread-like manner around a cylindrical wall of the adjusting spindle in a helical line. The position of the limitation can be freely selected along the entire axial thread length, whereby a fine adjustment is possible in order to limit the rotational movement of the adjusting spindle. As a result of the limitation of the rotational movement, the adjusting spindle is prevented from falling out of an adjustment unit. The limitation is preferably formed from the spindle itself. That is to say, the limitation has, for a limitation which is formed from the adjusting spindle, the same material composition and therefore the same material strength as the adjusting spindle. A premature material fatigue of the limitation with respect to the adjusting spindle is, as a result of the same material composition, taking into account the type of production of the limitation, minimized to the greatest possible extent. However, the limitation may also be arranged as a separate component on the adjusting spindle, whereby the durability of an adjusting spindle increases because after wear of the limitation only the limitation, but not the adjusting spindle, may be replaced.

In order to block the adjusting spindle, the limitation is not limited to a thread unit or a part-region of the adjustment unit. Any form of a stop for blocking the limitation and an arrangement of the stop for blocking the limitation outside the thread unit and outside the adjustment unit are conceivable. The shape of the thread unit is not limited. Preferably, the thread unit is constructed as a threaded ring. The threaded ring is arranged in the pressure piece and is in contact with the thread of the adjusting spindle.

In another embodiment, the limitation is formed radially toward the adjustment unit and has a height which is greater than a height of a thread base of the thread turn of the adjusting spindle. A thread base is intended to be understood to be the deepest region of the thread turn, starting from an axial axis of the adjusting spindle. The height, that is to say, the radial orientation of the limitation toward a thread turn tip is intended to have such dimensions that the limitation strikes a stop of the disc brake, preferably a stop of the thread unit, in a particularly preferred manner on a stop of the thread unit in the form of a tooth flank and blocks the adjusting spindle, for which reason the adjusting spindle cannot be unscrewed further in the direction of the brake disc.

In another advantageous embodiment, the limitation is a part-region of a thread flank of the adjusting spindle. The limitation of the adjusting spindle is achieved by means of a deformation of a part-region of the thread flank. The part-region of a thread flank of an opposing thread turn, which part-region is opposite the deformed part-region of the thread flank, is also deformed. The deformation of a part-region of the thread flank is more cost-effective compared with an additional component which is in the form of a limitation.

In another embodiment, the limitation is produced by one of the following production methods: machining production, shaping production, or application production. Depending on the production method, the production of the limitation may be completely integrated in the production process of the adjusting spindle. With a machining production of the adjusting spindle, at the location of the adjusting spindle at which the limitation is intended to be arranged, some material or no material is removed in the thread turn. The removal of the material is carried out as far as the thread base. During machining production, an adaptation of the tool trajectory of the tool is carried out in the region for forming the limitation, in a particularly preferred manner by indexable inserts, which tool forms the thread turn. The term "tool trajectory" is intended to be understood to be the path of the tool along a predefined path.

In the case of a shaping production of the limitation, in place of the adjusting spindle, on which the limitation is intended to be formed, partial deformation of the thread turn with adaptation of the tool geometry of the shaping tool is again carried out. In the described production operations, that is to say, the shaping production and the machining production, the limitation is produced directly in the blank in order to form the adjusting spindle. In the third method, also known as application or coating, in order to form the limitation in the thread turn material is applied. For example, welding, adhesive bonding, or soldering are known to the person skilled in the art as application production methods. In the embodiment of a limitation by an adhesive bonding process, the use of an adhesive which cures under a UV light is conceivable. However, other types of adhesives for forming the limitation are also conceivable.

If the limitation is produced by means of the production method shaping production, the shaping production is a thread rolling process in a preferred embodiment. The term "thread rolling" is intended to be understood by the person skilled in the art to be a shaping and reinforcement of metal surfaces. During thread rolling, a thread roller or several thread rollers are acted on with a force, also known as a rolling force, which is directed perpendicularly to the running face. At the location of the adjusting spindle, on which the limitation is intended to be formed, there is carried out no deformation or partial deformation, that is to say, no formation of the thread. It is also conceivable to configure the complete thread turn using the thread rolling process.

In another embodiment, it has additionally been found to be advantageous for the part-region of the thread flank of the adjusting spindle to be deformed by means of the production method pressing. The pressing of iron materials is also known as a shaping process, in which, using high pressures, the metal material, therefore the blank, is deformed in order to form the spindle. As already described in the third advantageous embodiment, the rotation limitation of the adjusting spindle is achieved by means of a deformation of a part-region of the thread flank.

In another advantageous embodiment, the limitation further has, in the radial form, a dimension which is greater than the radial spacing of a stop of the thread unit with respect to an axial axis of the adjusting spindle. With the radial form of the limitation, it is ensured that the stop also actually strikes the limitation and prevents the adjusting spindle from being unscrewed further from the adjustment device.

The radial form of the limitation is dependent on the configuration of the thread, that is to say, the shape, height, width and depth of the thread and the configuration of the stop of the thread unit.

In another embodiment, at least one region of the limitation extending in a radial direction and the stop of the thread unit extend relative to each other with a uniform spacing to the greatest possible extent. That is to say, between the side flank of the limitation and the stop which is constructed as a tooth flank, there are to the greatest possible extent no differences in the geometric form which could lead to a jamming of the limitation with the stop of the thread unit.

In a last embodiment, the limitation is configured for the limitation to strike a stop of the thread unit in order to prevent the adjusting spindle from being axially unscrewed in the direction of a brake disc of the disc brake. During a restoring operation of the adjusting spindle, the stop of the thread unit engages in the thread turn of the adjusting spindle and blocks further unscrewing of the adjusting spindle in the direction of the brake disc when the limitation has reached the stop of the thread unit.

BRIEF DESCRIPTION OF THE DRAWINGS

Selected embodiments of the invention will be explained below with reference to the appended Figures, in which.

DETAILED DESCRIPTION OF THE DRAWINGS

Figure 1:
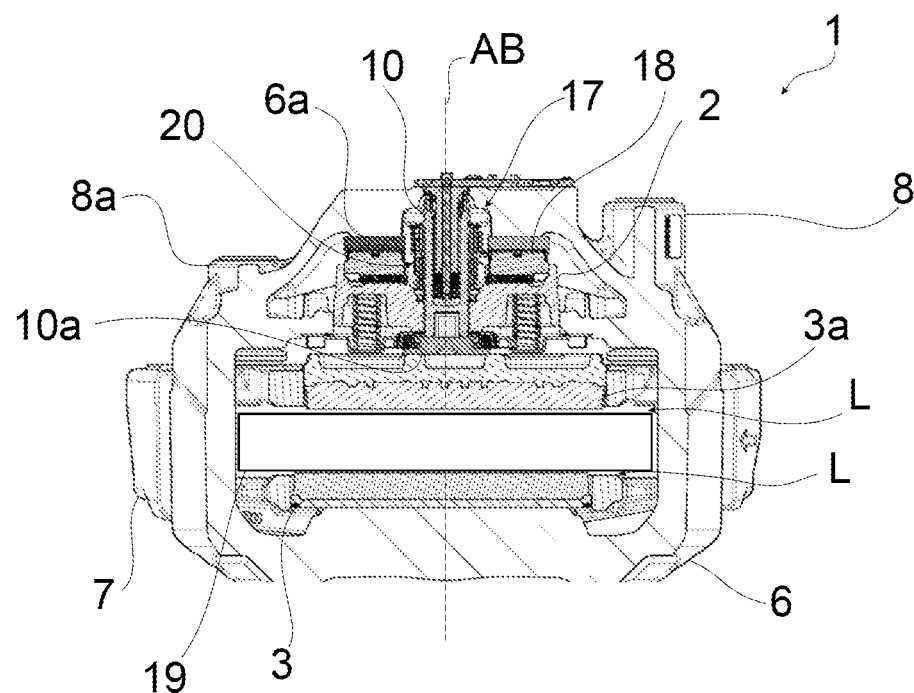
FIG. 1 shows a disc brake having an adjusting spindle.

FIG. 1 is a perspective view of a disc brake 1 having an adjusting spindle 10. The disc brake 1 has a brake caliper 6 which is supported by guiding pins 8, 8a in a sliding manner on a brake carrier 7. The adjusting spindle 10 is arranged, as part of a tensioning unit 17 centrally along an axial axis AB of the disc brake 1, in the brake caliper 6. The tensioning unit 17 further includes a rotary lever 18 which is supported on an inner wall 6a of the brake caliper 6. The rotary lever 18 axially tensions a brake disc 19 along the axial axis AB of the disc brake 1 via a pressure piece 2 and via two brake liners 3, 3a. In order to adjust an air gap L, an adjustment unit 20 is additionally arranged on the adjusting spindle 10. The correction of the air gap L is carried out where necessary during the feed movement of the rotary lever 18 or more specifically during the bridging of the air gap L. During the feeding operation, a pressure plate 10a which is axially arranged on the adjusting spindle 10 presses against the brake liner 3a, wherein the brake liner 3a is displaced in the direction of the brake disc 19. With an increasing brake liner wear, the adjusting spindle is moved in order to adjust the air gap L further in the direction of the brake disc 19.

Figure 2:
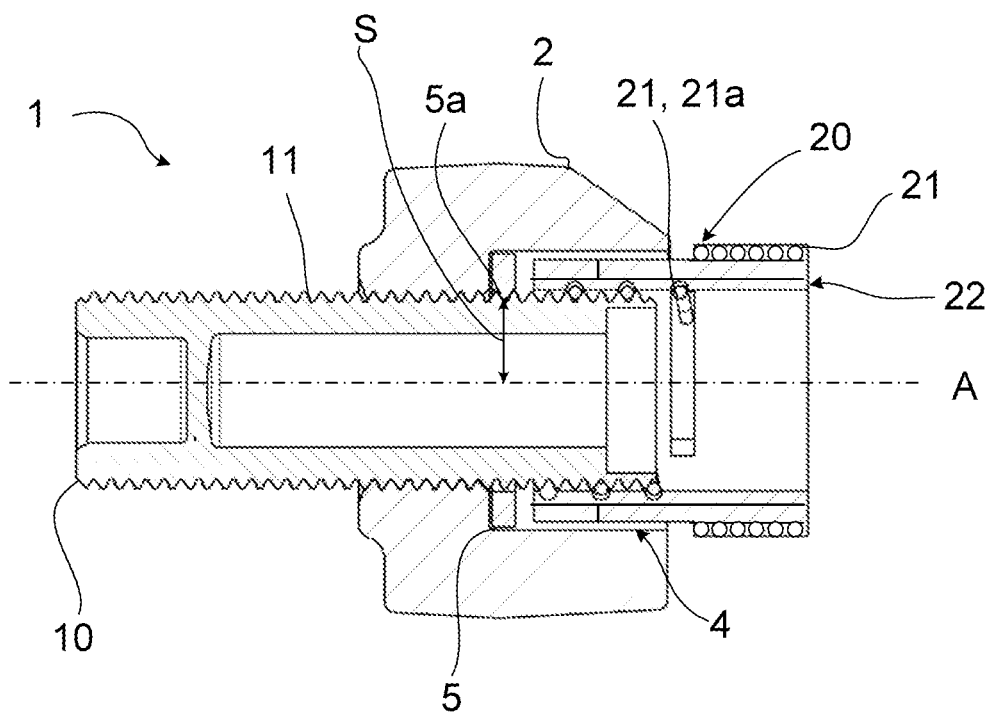
FIG. 2 is a laterally sectioned view of a tensioning unit of a disc brake according to FIG. 1.

The maximum position, that is to say, the limit state of the adjusting spindle 10 according to FIG. 1, is illustrated in FIG. 2. The limit state is intended to be understood to be the state of the adjusting spindle 10 in which the adjusting spindle 10 can still be adjusted by the adjustment unit 20. Further unscrewing of the adjusting spindle 10 from the pressure piece 2 and the adjustment unit 20 which is arranged on the adjusting spindle 10 results in the adjusting spindle 10 no longer being able to be adjusted via the adjustment unit 20 and the adjustment unit 20 not remaining in position, or where applicable becoming jammed, whereby the adjustment unit 20 loses its adjustment function. The adjustment unit 20 has resilient elements 21 and guiding bushes 22, wherein the adjusting spindle 10 is connected to the adjustment unit 20 by a wrap spring 21*a*. The wrap spring 21*a* is a component of the adjustment unit 20. Both the adjusting spindle 10 and the adjustment unit 20 are supported, axially along the axis A of the adjusting spindle 10, partially in the pressure piece 2. More specifically, the adjustment unit 20 is supported on the adjusting spindle 10.

Figure 3:
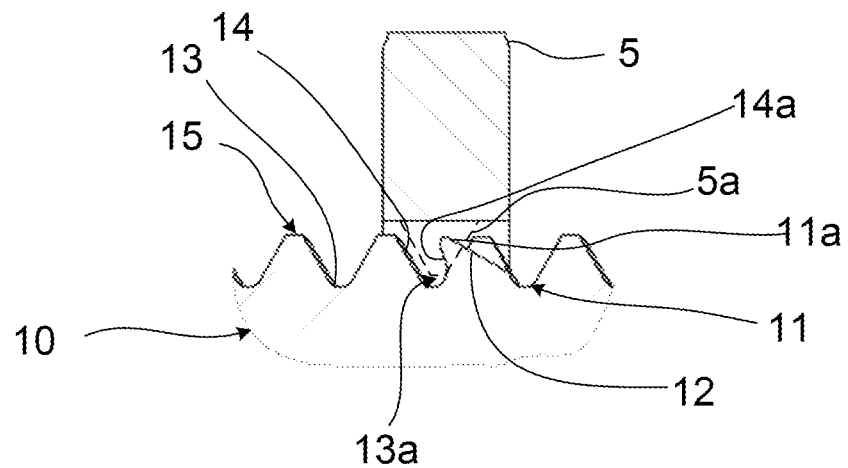
FIG. 3 is a cut-out of the adjusting spindle according to FIG. 2 with a limitation formed by a shaping process.

FIG. 3 shows an adjusting spindle 10 according to FIG. 1 and FIG. 2 and including a limitation 12 according to the present disclosure. The limitation 12 of FIG. 3 is constructed as a shaped limitation 12 and prevents further unscrewing of the adjusting spindle 10 from the adjustment unit 20 (see FIG. 1 and FIG. 2) by blocking stop 5*a*, which is in the form of a tooth flank 5*a*, of the thread unit 5. In order to form the limitation 12, a cut-out of the thread flank 14 is shaped using a pressing tool. When viewed from a thread base 13 of the thread 15, the pitch angle of the shaped thread flank 14*a* has been changed in comparison with the original pitch angle. A part-region of the shaped thread turn tip 11*a* thus partially spans the region 13*a* of the thread base 13 which is arranged between the thread flank 14*a* and the thread flank 14. The limitation 12 has, with regard to the radial form, a dimension which is greater than the spacing S of a schematically illustrated stop 5*a* (FIG. 2) of the thread unit 5 with respect to an axial axis A of the adjusting spindle.

Figure 3A:
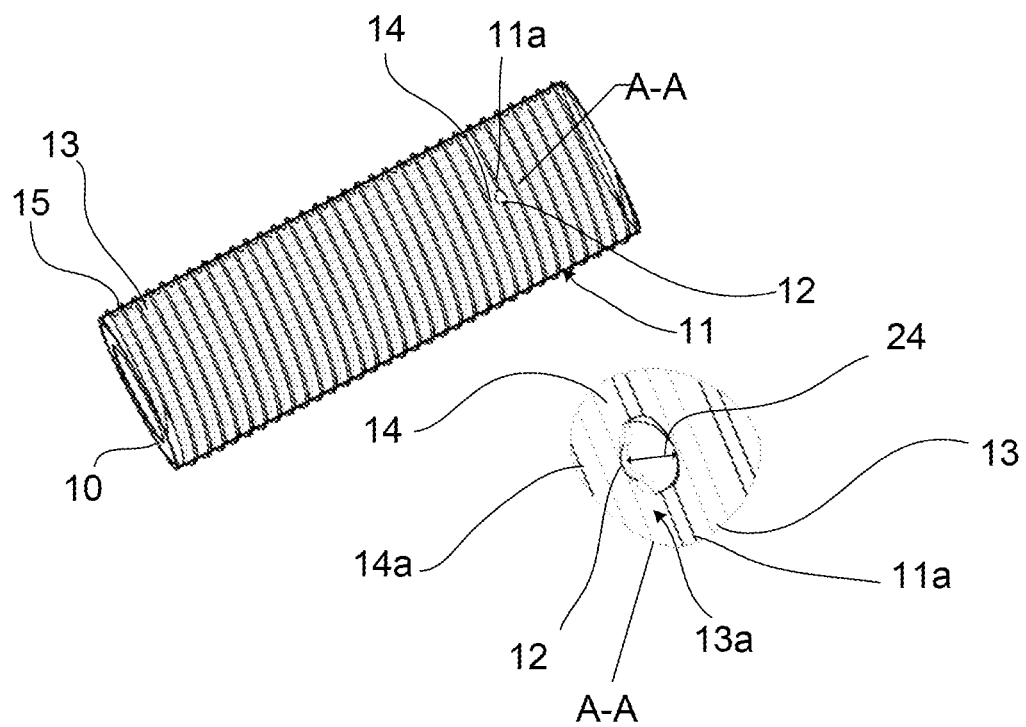
FIG. 3a is a perspective view of an adjusting spindle of a tensioning unit according to FIGS. 2 and 3.

FIG. 3*a* is a perspective view of the adjusting spindle according to FIG. 1, FIG. 2 and FIG. 3 with the shaped limitation 12. An active diameter 24 of the shaping tool can be clearly seen.

Figure 4:
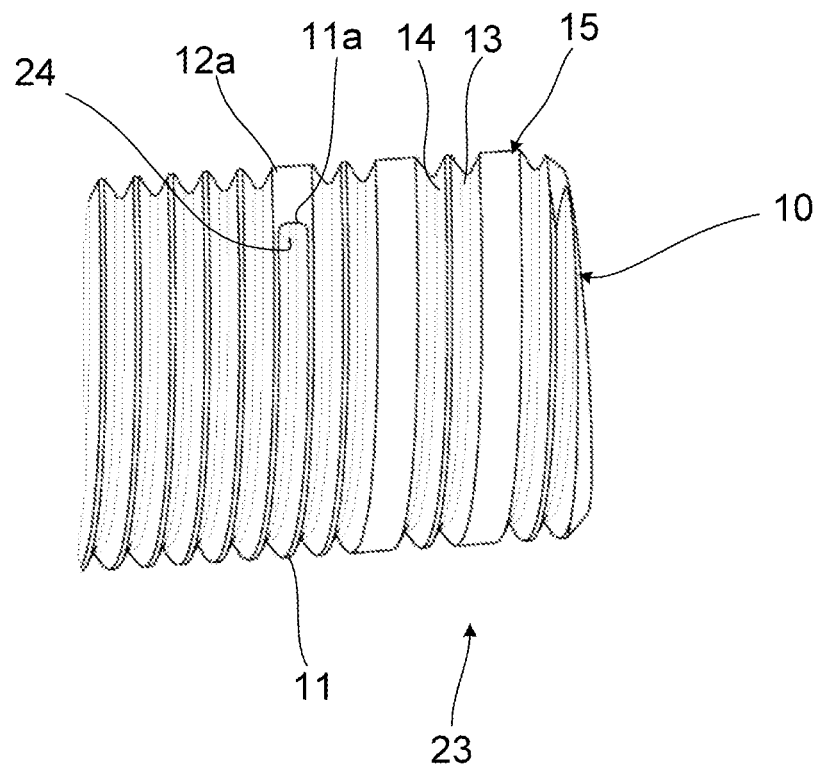
FIG. 4 is a partial perspective view of the adjusting spindle according to FIG. 2 with a limitation produced using a machining operation.

Another embodiment of the limitation 12 can be seen in FIG. 4. FIG. 4 is a partial perspective view of the adjusting spindle 10 according to FIG. 1 and FIG. 2 with a limitation 12*a* which is produced by machining. The limitation 12*a* is formed in an end region 23 of the adjusting spindle 10. The end region 23 is the region of the adjusting spindle 10 opposite the pressure plate 10*a* (FIG. 1). The thread 15 is cut into the adjusting spindle 10, wherein the limitation 12*a* is a non-processed portion of the thread 15. The thread turn 11 is thus not formed in the region of the limitation 12*a*.

Figure 5:
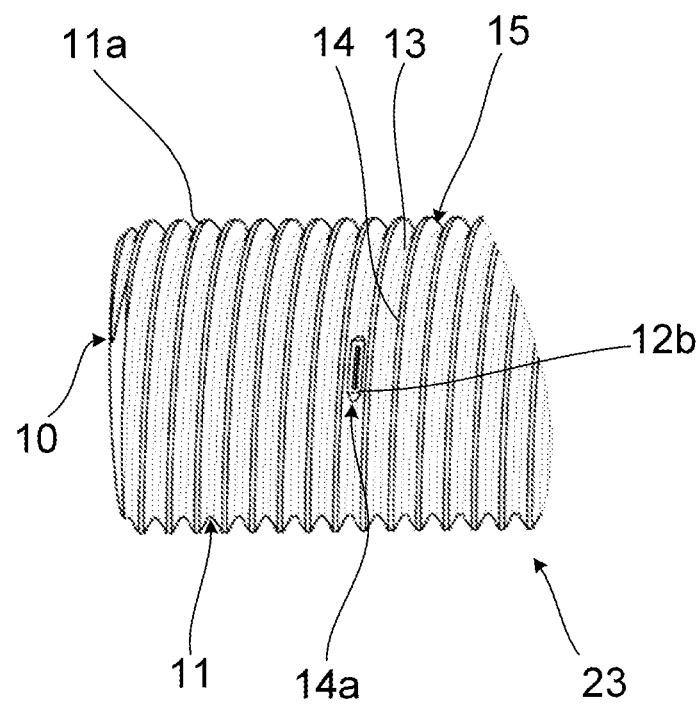
FIG. 5 is a partial perspective view of the adjusting spindle according to FIG. 2 with a limitation which is produced by means of rolling.

FIG. 5 is a partial perspective view of the adjusting spindle according to FIG. 1 and FIG. 2 with a limitation 12*b* which is produced by rolling. The limitation 12*b* is fitted during the production of the adjusting spindle 10 at any position along the spindle axis in a thread turn 11.

Figure 6:
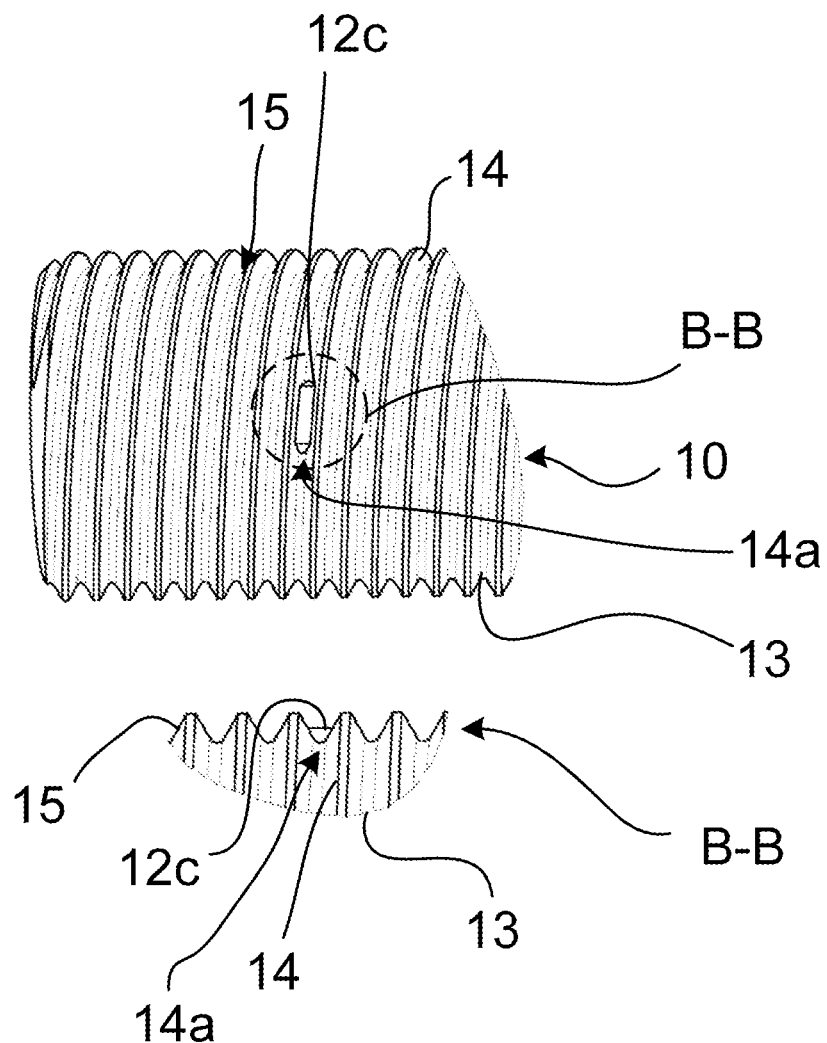
FIG. 6 is a partial perspective view of an adjusting spindle having a limitation produced by adhesive bonding.

FIG. 6 is a perspective view of the adjusting spindle according to FIG. 1 and FIG. 2 with a limitation 12*c* produced by means of adhesive, soldering, or welding material. The radial form of the limitation 12 can be clearly seen.

While the above description constitutes the preferred embodiments of the present invention, it will be appreciated that the invention is susceptible to modification, variation and change without departing from the proper scope and fair meaning of the accompanying claims.

What is claimed is:

1. A disc brake (1) for motor vehicles, the disc brake comprising:
    a pressure piece (2) that receives an actuating force which is arranged along an axial axis (AB) of the disc brake (1),
    at least one adjusting spindle (10) having a thread (15), wherein the thread (15) has at least one thread turn (11), wherein the adjusting spindle translates axially in response to the actuating force applied on the pressure piece, wherein the adjusting spindle transmits the actuating force to a pressure plate, wherein the pressure plates transmits the actuating force to a brake pad; and
    an adjustment unit (20) for adjusting an air gap (L) of the disc brake (1),
    wherein the adjusting spindle (10) is guided axially at least partially through an opening (4) of the pressure piece (2), wherein the opening of the pressure piece is provided with a thread unit (5), and
    wherein the adjusting spindle (10) is guided at least partially through an opening in the adjustment unit (20) and the adjustment unit (20) axially protrudes at least partially into the opening (4) of the pressure piece (2),
    wherein the adjusting spindle (10) includes a limitation (12, 12*a*, 12*b*, 12*c*) disposed in the thread turn (11);
    wherein the limitation in the thread turn of the spindle contacts a stop (5*a*) of the thread unit (5) and limits adjustment of the spindle (10) relative to the thread unit (5) disposed in the opening of the adjustment unit (20).

2. The disc brake (1) as claimed in claim 1, wherein the limitation (12, 12*a*, 12*b*, 12*c*), starting from a thread base (13) of the thread turn (11) of the adjusting spindle (10), extends radially toward the adjustment unit (20).

3. The disc brake as claimed in claim 2,
    wherein the thread unit (5) includes the stop (5*a*), which defines a radial spacing(S) from the axial axis (A), wherein the limitation (12, 12*a*, 12*b*, 12*c*) has a radial dimension from the axial axis (A) which is greater than the radial spacing(S) of the stop (5*a*) of the thread unit (5), such that the stop (5*a*) and the limitation overlap radially.

4. The disc brake (1) as claimed in claim 3, wherein the limitation and the thread unit (5) overlap axially when the limitation engages the stop (5*a*).

5. The disc brake (1) as claimed in claim 1, wherein the limitation (12, 12*a*, 12*b*, 12*c*) is a part-region (14*a*) of a thread flank (14) of the adjusting spindle (10) or the limitation (12, 12*a*, 12*b*, 12*c*) is a part-region (14*b*) of the spindle (10).

6. The disc brake (1) as claimed in claim 5, wherein the limitation (12, 12*b*, 12*c*) which is in the form of part of the thread flank (14) is deformed by a shaping operation.

7. The disc brake (1) as claimed in claim 1, wherein the limitation (12, 12*a*, 12*b*, 12*c*) is formed by machining, shaping, or material application.

8. The disc brake (1) as claimed in claim 7, wherein the limitation (12, 12*a*, 12*b*, 12*c*) is formed by shaping and the shaping is a rolling process.

9. The disc brake (1) as claimed in claim 1, wherein the limitation (12, 12*a*, 12*b*, 12*c*) is configured to strike the stop (5*a*) of the thread unit (5) and to prevent the adjusting spindle (10) from being axially unscrewed toward a brake disc of the disc brake (1).

10. The disc brake (1) as claimed in claim 1,
wherein the spindle (10) is disposed radially inward relative to the thread unit (5) and is threadingly engaged with the thread unit (5);
wherein the spindle (10) is disposed radially inward relative to the adjustment unit (20);
wherein the thread unit (5) and the adjustment unit (20) are each disposed radially inward relative to an inner surface of the pressure piece (2) that defines the opening of the pressure piece (2).

* * * * *